United States Patent [19]

Arataki et al.

[11] Patent Number: 5,694,383
[45] Date of Patent: Dec. 2, 1997

[54] DECODER/ENCODER CAPABLE OF CONTROLLING DATA READING/WRITING OPERATIONS TO MEMORY IN RESPONSE TO FIRST/SECOND CLOCKS, REPRODUCING APPARATUS EQUIPPED WITH ENCODER/DECODER, AND RECORDING APPARATUS EQUIPPED WITH ENCODER

[75] Inventors: Yuji Arataki; Han Min-Jae, both of Tokyo, Japan

[73] Assignee: Sony Corporation, Tokyo, Japan

[21] Appl. No.: 598,009

[22] Filed: Feb. 7, 1996

[30] Foreign Application Priority Data

Feb. 13, 1995 [JP] Japan ................................ 7-046652

[51] Int. Cl.[6] ...................................................... H04N 5/76
[52] U.S. Cl. ............................................... 369/59; 369/60
[58] Field of Search ............................ 369/59, 60, 54, 369/58, 32

[56] References Cited

U.S. PATENT DOCUMENTS

| | | | |
|---|---|---|---|
| 5,444,687 | 8/1995 | Okumura | 369/60 |
| 5,463,607 | 10/1995 | Roth et al. | 369/60 |
| 5,491,677 | 2/1996 | Sasaki | 369/60 |
| 5,517,477 | 5/1996 | Sako | 369/60 |

FOREIGN PATENT DOCUMENTS

| | | |
|---|---|---|
| 0 260 722 A2 | 3/1988 | European Pat. Off. . |
| 0 429 139 A1 | 5/1991 | European Pat. Off. . |
| 0 490 400 A1 | 6/1992 | European Pat. Off. . |
| 0 549 375 A2 | 6/1993 | European Pat. Off. . |
| 0 554 858 A2 | 8/1993 | European Pat. Off. . |
| 0 563 922 A2 | 10/1993 | European Pat. Off. . |
| 0 596 417 A2 | 5/1994 | European Pat. Off. . |

Primary Examiner—Nabil Hindi
Attorney, Agent, or Firm—Limbach & Limbach L.L.P.

[57] ABSTRACT

A recording/reproducing apparatus is free from a jitter problem caused by a rotational drive of a recording medium such as a magneto-optical disk. A reproducing apparatus is comprised of: reproducing means for reading out data from a recording medium; signal processing means for performing a predetermined signal process to the data read by the reproducing means; storage means for temporarily storing the data processed by the signal processing means; write control means for controlling a writing operation of the signal-processed data into the storage means; read control means for controlling a reading operation of the data temporarily stored in the storage means therefrom; first clock generating means for extracting a clock synchronized with the drive of the recording medium from the data reproduced from the recording medium to thereby generate a first clock; second clock generating means for generating a stabilized clock; and control means for controlling both of the signal processing means and the write control means based upon the first clock generated from the first clock generating means, and also for controlling the read control means based on the stabilized clock generated from the second clock generating means.

10 Claims, 10 Drawing Sheets

Prior Art

DECODER/ENCODER CAPABLE OF CONTROLLING DATA READING/WRITING OPERATIONS TO MEMORY IN RESPONSE TO FIRST/SECOND CLOCKS, REPRODUCING APPARATUS EQUIPPED WITH ENCODER/DECODER, AND RECORDING APPARATUS EQUIPPED WITH ENCODER

BACKGROUND OF THE INVENTION

1. Field of the Invention

The present invention relates to a recording apparatus and a reproducing apparatus, capable of recording/reproducing data such as a music signal on/from a recording medium, e.g., a recording disk and a recording tape, and also relates to an encoder circuit and a decoder circuit, mounted on these recording/reproducing apparatuses.

2. Description of the Prior Art

User-data-rewritable magneto-optical disks capable of recording thereon audio data are known in the field. Among those disk media, such a disk with shock proof functions improved by employing, especially, buffer memories could be realized.

For instance, in a magneto-optical disk system capable of recording/reproducing audio data by employing a magneto-optical disk, audio data read out from the magneto-optical disk are intermittently written into a buffer RAM at a high speed rate during reproducing operations, whereas the audio data are continuously read from the buffer RAM at a low speed rate so as to demodulate these audio data as audio reproduction signal. During the reproducing operation, a certain amount of audio data are continuously kept in the buffer RAM. As a result, even when a track jump happens to occur due to externally applied vibrations and thus the data reading operation from the magneto-optical disk is temporarily interrupted, the audio data can be continuously read out from the buffer RAM, so that the audio reproduction signal can be outputted without any interruption.

Also, during the recording operation, input audio data are once continuously written into the buffer RAM at a low speed rate, and the audio data once stored are intermittently read therefrom to be supplied to a recording head, so that the audio data are recorded on the magneto-optical disk.

As shown in FIG. 1A, a recording track in the magneto-optical disk functioning as the recording medium in the above-explained magneto-optical disk system is constructed of a plurality of clusters. As indicated in FIG. 1B, one cluster is constituted of a sub-data region having 4 sectors (1 sector=2,352 bytes) and a main data region having 32 sectors. In this magneto-optical disk, 1 cluster is used as a minimum unit during the recording operation. One cluster corresponds to 2 to 3 tracks of this magneto-optical disk. It should be understood that an address is recorded on the disk every 1 sector.

The sub-data region of 4 sectors is used as sub-data and a linking area, whereas TOC (table of contents) data and audio data are recorded in the main data region of 32 sectors.

The above-described sector is further subdivided into sound groups. As represented in FIG. 1C, FIG. 1D, and FIG. 1E, 2 sectors are subdivided into 11 sound groups. 2,332 bytes are available for data within1 sector (=2,352 bytes), and 1 sound group corresponds to 2,332 bytes×2 sectors+ 11=424 byte/sound group. Within the sound group consisting of 424 bytes/sound group, data are separated into a left channel and a right channel to record an audio signal where 1 sound group is an amount of audio data corresponding to 11.6 milliseconds. 212 bytes which constitute the data region in the left channel, or the right channel are referred to a sound frame.

In the case where the data which has been recorded on the disk in such a format is recorded or reproduced via the buffer RAM, the data recording operation is carried out in unit of sector within the buffer RAM. The access address with respect to the buffer RAM is managed by a sector address and a byte address (0 to 2,351 bytes) in a sector. The data reading/writing operations for the buffer RAM are performed on the basis of the sector address and the byte address.

In the above-explained magneto-optical disk system, two sorts of clocks are employed in the recording signal processing circuit system and the reproducing signal processing circuit system, and these two clocks are not synchronized with each other.

In the processing system of the reproducing apparatus, the data read from the disk is decoded by the EFM (Eight-Fourteen Modulation) decoding manner, and further processed by the ECC (Error Correct Coding) process, and is sector-decoded. Therefore, the finally processed/decoded data is stored into the buffer RAM. The expanding process is carried out to the data read from the buffer RAM with respect to the audio compressing process, thereby obtaining reproduced audio data. Since the EFM signal to be EFM-decoded, namely the data read from the disk contains the jitter component of the disk, such a clock is employed during the EFM decoding process, which is synchronized with the disk rotation. In other words, the clock (PLL data clock) extracted from the EFM signal by using the PLL circuit is utilized.

On the other hand, the master clock produced from the crystal oscillator system is utilized in the processing circuits subsequent to the ECC process circuit.

Also, in the processing system of the recording apparatus, after the input signal is audio-compression-encoded, the encoded data is stored into the buffer RAM. Then, the data read from the buffer RAM is processed by way of the sector encoding, ECC encoding, and EFM modulation, and the processed data is supplied to the magnetic head. In these process operations, a master clock MCK produced from the crystal oscillator system is employed.

On the other hand, such a clock (PLL groove clock) produced by injecting the information extracted from the groove on the disk into the PLL circuit is employed to servo-control the rotation of the disk.

In FIG. 2 and FIG. 3, there are shown the signal process block (decoder system) of the conventional reproducing apparatus including such two clock signal systems, and the signal process block (encoder system) of the conventional recording apparatus including such two clock signal systems.

An arrangement of a decoder system for an audio signal recorded on a disk 101 in the reproducing apparatus is indicated in FIG. 2.

The disk 101 is illuminated with laser from an optical head 103 while being rotated at a constant linear speed by a spindle motor 102.

An optical head 103 outputs a reflection light detecting signal derived from the disk 101 to an RF amplifier 104. The RF amplifier 104 extracts a reproduced RF signal from the reflection light detecting signal. Then, this reproduced RF signal is digitalized to obtain an EFM (eight-to-fourteen modulation) signal which is equal to reproduced data from the disk 101.

This EFM signal is supplied to an EFM decoder 105, a PLL timing generator 106, and an EFM sync detecting unit 107.

The EFM sync detecting unit 107 detects a sync pattern within the EFM signal frame. The PLL timing generator 106 detects an edge of the EFM signal, and then the output of this edge detection is injected into the PLL circuit to produce a PLL data clock PLCK. This PLL data clock PLCK is synchronized with the rotation of the disk 101, and therefore is such a clock containing the rotation jitter component of the disk 101.

Furthermore, the PLL timing generator 106 generates various sorts of timing signals based upon the PLL data clock PLCK and the EFM sync.

The EFM decoder 105 performs the EFM demodulating process with employment of the PLL data clock PLCK, and transfers EFM-demodulated data to a data bus 110. The sub-code information is extracted from the EFM-modulated data by a sub-code detecting unit 108, and then is supplied from a terminal 109 to a system controller for controlling the entire apparatus.

The data which has been EFM-demodulated and transferred to the data bus 110 is written into an ECC-RAM 111. When this data is written into the ECC-RAM 111, a write demand is issued to a priority encoder 112 in response to a write frame clock WFCK synchronized with the EFM signal supplied from the PLL timing generator 106. The write frame clock WFCK is also supplied to a write base counter 113 so as to be counted up.

On the other hand, a read demand is issued to the priority encoder 112 in response to a read frame clock RFCK produced by frequency-dividing the master clock MCK of the crystal oscillator system from a timing generator 119 to which the master clock MCK of the crystal oscillator system is supplied in order to read the data from the ECC-RAM 111. Also, an error correction demand is issued to the ECC decoder 117. The read frame clock RFCK is also supplied to the read base counter 115 so as to be counted up.

The demand selected from the write demand and the read demand by the priority encoder 112 is issued via the data bus 110 to the ECC-RAM 111.

Read/write addresses for the ECC-RAM 111 are generated by an address generator 116. The address generator 116 generates read/write addresses Ad1 based upon a count value of a write base counter 113 corresponding to the counter employed in the PLL clock system, and also another count value of a read base counter 115 employed in the master clock system.

The data which has been EFM-demodulated and transferred to the data bus 110 is written into the ECC-RAM 111, since the write demand is selected by the priority encoder 112, and the write address Ad1 is generated by the address generator 116 in response to the count value of the write base counter 113. In other words, the writing operation is carried out as the operation of the PLL clock system.

On the other hand, the error correction by an ECC processing unit 117 is performed with respect to the data written into the ECC-RAM 111. For this correction, the read demand is issued to the ECC-RAM 111 via the priority encoder 112. Also, the read address Ad1 is generated by the address generator 116 in response to the count value of the read base counter 115 so as to read the data.

When the write processing operation of the ECC-RAM 111 and the read processing operation thereof are performed, the clocks used in these processing operations are different from each other, so that there are jitter components on the time base in both of the read/write processing operations. Then, since the write access and the read access are executed in synchronism with the two clocks, it is required to control the rotations of the disk 101 in order to compensate for the access arbiter and the low frequency component of the jitter. Therefore, the count outputs from the write base counter 113 and the read base counter 115 are supplied to a CLV processor 114. The CLV processor 114 produces the rotation servo control value based upon a difference between the count outputs of the write base counter 113 and the read base counter 115, and then outputs this rotation servo control value to the servo system for the spindle motor 102.

The data Dt which is error-corrected in the ECC processing unit 117 is once transferred from a data read interface unit 118 via a data bus 110 to a sector decoder 120. Also, discrimination information C2PO issued when no error correction can be performed is transferred under timing control of the timing generator 119.

Furthermore, a bit clock BCK and an LR clock LRCK synchronized with the data Dt is supplied from the timing generator 119 to the sector decoder 120.

In the sector decoder 120, a so-called "CD-ROM format" is decoded and the decoded format is transferred to a data bus 122.

The data read and write operations to the buffer RAM 123 are carried out on the basis of the demand selection by the priority encoder 121 and the address generation by the address generator 124. To the priority encoder 121, the write command is issued from the sector decoder 120, the read command is issued from the audio expansion processing unit 126, and either the write command, or the read command is issued from the system controller via a control interface 125. As previously explained, since the data transfer rate at which the data is written into the buffer RAM 123 is higher than the data transfer rate at which the data is read out from the buffer RAM 123, normally, the priority encoder 121 selects the write command issued from the sector decoder 120, or the read command issued form the audio expansion processing unit 126 in order to adjust a difference between the data transfer rates.

After the data transferred from the sector decoder 120 to the data bus 122 has been written into the buffer RAM 123, this data is read in response to the read demand issued from audio expansion processing unit 126, and then is supplied via the data bus 122 to the audio expansion processing unit 126. In the audio expansion processing unit 126, the Inverse Modified-Discrete Cosine Transform audio expanding process is carried out to the read data, so that this read data is transformed into such digital data with 16-bit quantizing bits and the sampling frequency of 44.1 kHz. This digital data is D/A-converted by a D/A converter 127 into an analog signal which will then be outputted from a terminal 128 as a reproduced audio signal.

Next, FIG. 3 schematically shows an encoder system for an audio signal, constructed in the recording apparatus.

An audio signal inputted into a terminal 130 is processed in an A/D converter 131 belonging to the master clock MCK system to obtain 16-bit quantized digital data of the sampling frequency of 44.1 kHz. Then, this digital data is supplied to an audio compression processing unit 132 so as to be processed by the Modified-Discrete Cosine Transform, by which a data amount is compressed by ⅕.

In response to a write command issued from the audio compression processing unit 132, the audio-compressed data is written via a data bus 122 to a buffer RAM 123. A read/write address Ad4 for the buffer RAM 123 is generated from an address generator 124 either under control of the timing generator 119, or under control of the system controller. The timing generator 119 generates various sorts of timings by employing the master clock MCK.

In the case that an amount of data stored in the buffer RAM 123 reaches a predetermined amount exceeding 1 cluster during the recording operation, the data is read from the buffer RAM 123 and the data is transferred to a sector encoder 133.

In the sector encoder 133, the encode process in the sector form is carried out by using the bit clock BCK and the LR clock LRCK supplied from the timing generator 119, and then the encoded data is transferred to a data write interface 134. The data transferred to the data write interface 134 is written via a data bus 110 into the ECC-RAM 111.

A read/write address Ad3 to the ECC-RAM 111 is generated from an address generator 116 in response to an FCK signal produced from the timing generator 119. The ECC encoder 135 reads the data stored in the ECC-RAM 111 to be processed by adding the parity bit thereto.

The data which has been processed in the ECC encoder 135 is transferred to an EFM encoder 136 in order to be EFM-modulated (eight-to-fourteen modulation). This EFM signal is sent to a magnetic head drive circuit 137, and then a magnetic head 138 applies a magnetic field to the disk 101 in response to the EFM signal.

It should be noted that the above-explained various process operations during the recording operation are executed on the basis of the master clock MCK of the crystal oscillator system.

On the other hand, in the disk rotation control system for the disk 101 during the recording operation, the process operations are carried out in response to the clock produced by employing the PLL circuit in synchronism with the rotations of the disk 101.

The disk 101 rotated by a spindle motor 102 is illuminated with laser by an optical head 103, and reflection light information is supplied to an RF amplifier 104.

In the above-described recordable magneto-optical disk, the recording tracks have been previously formed by way of the groove. Moreover, the absolute positional information (address information) is wobbled on this groove (namely, wobbling process) in accordance with the FM modulating process with employment of the carrier of 22.0±1 kHz.

In the RF amplifier 104, such FM-modulated groove information GFM is extracted. This groove information GFM is supplied to a groove PLL circuit 139, so that a PLL groove clock GCK is produced in synchronism with this groove information GFM.

The groove information GFM is supplied to a groove sync detecting unit 140 by which a sync detection is performed with employment of the PLL groove clock GCK. In a groove address decoder 142, an address decoding process is executed with employment of the PLL groove clock GCK, so that the groove address information is demodulated. Both of the groove sync and the groove address are supplied to the system controller.

Also, the groove information, GFM and the PLL groove clock GCK are supplied to a CLV (Constant Linear Velocity) processor 114. The CLV processor 114 outputs error components of the frequency and phase between the clock MCK1 generated from the timing generator 119 on the basis of the crystal oscillator system, and the PLL groove clock GCK to a CLV servo system as the servo control values of the spindle motor.

As described above, in the magneto-optical disk system, both of the PLL data clock and the master clock are employed in the decoder system, whereas both of the PLL groove clock and the master clock are utilized in the encoder system. That is, two sorts of clocks which are not synchronized with each other, namely asynchronous, are employed in the decoder system and the encoder system, respectively.

Since such different sorts of asynchronous clocks are employed, there are the below-mentioned problems.

First, in the decoder system of FIG. 2, the data writing system to the ECC-RAM 111 and the data reading system from the ECC-RAM 111 are operated in response to the different clocks.

As to the data writing operation to the ECC-RAM 111, the PLL data clock PLCK is employed which contains the jitter component caused by the rotational fluctuations of the disk 101. On the other hand, since the master clock MCK of the crystal oscillator system is utilized in the data reading operation, the jitter margin area used to compensate for the jitter is necessarily required in the ECC-RAM 111.

However, since the memory space provided in the ECC-RAM 111 is apparently a finite memory space, even when the CLV servo system is locked, if the ECC-RAM 111 is overflown, then the decoding operation would be interrupted. When, for instance, constant deviation is present in the CLV servo, the jitter margin area formed on the ECC-RAM 111 is gradually occupied, so that an overflow will occur. This constant deviation is accumulated, and then the accumulated constant deviation cannot be absorbed by the jitter margin area within the ECC-RAM 111, resulting in unstable decoding operations.

To avoid such an overflow of the ECC-RAM 111, the gain of the CLV servo in the low frequency range must be sufficiently maintained. This may require either an amplifier for increasing the gain in the low frequency range, or a motor with high torque. As a result, unwanted power consumption would be required. Therefore, there is a problem in the power saving aspect. When the recording/reproducing apparatus is operable by cells, the lifetime of cells would be shortened.

Moreover, in order to read/write the data from/into the ECC-RAM 111, the separate base counters, i.e., the write base counter 113 and the read base counter 115 are required. Also, the priority encoder 112 is required so as to control the operations. In addition, the CLV processor 114 is needed in order to reflect the jitter control between both of these clocks to the CLV servo system.

Because of the above-explained conditions, the resulting circuit system would become complex, and there are demerits in view of the circuit scale and the manufacturing cost.

Subsequently, observing the encoder system shown in FIG. 3, the master clock MCK is employed in the data encoding system, and the PLL groove clock is used in the CLV servo system.

In order for the groove information GFM on the disk 101 to be synchronized with data to be recorded (EFM signal) within a preselected tolerance VS jitter, the system controller must perform a process operation such that the start timing at which the data is read from the buffer RAM 123 and then is transferred via the sector encoder 133 to the ECC processing system, is determined by using the groove sync detection timing as a reference, while considering a so-called "encode delay" defined from the EFM encoder 136 to the magnetic head drive circuit 137. Also, during the recording operation, the deviation in the PLL groove clock GCK, and the phase difference between the groove address and the sector address encoded into the data are monitored. When these deviation and the phase difference are deviated from a preselected range, this recording operation is once interrupted. After a predetermined head address of the disk 101 is accessed, the recording operation is again commenced.

Under such circumstances, the magneto-optical disk system will be brought into such a system whose recording operation could not be compensated while the groove PLL circuit 139 is under a locking state. Also, a sufficient CLV servo band and a sufficient CLV servo gain should be maintained. The stability of the encoding operation could not be sufficiently achieved similar to that of the decoder, and there is a power consumption problem.

In addition, the CLV processor 114 is required in this encoder system so as to reflect the jitter control between both of these different clocks to the CLV servo system. This may cause such disadvantages as the circuit scale and the cost.

SUMMARY OF THE INVENTION

The present invention has been made so as to solve the above-described problems, and therefore, has an object to a recording apparatus, a reproducing apparatus, an encoder circuit, and a decoder circuit, whose stable operabilities could be achieved under low power consumption.

The present invention is to provide a reproducing apparatus equipped with a decoder such, and to provide a decoder such that a writing operation of data read from a recording medium into a memory for temporarily storing the data is performed in response to a sync signal read from the recording medium, whereas a reading operation of the data from this memory is performed in response to a stabilized clock.

To achieve these objects, a reproducing apparatus, according to one aspect of the present invention, is featured by comprising:

a reproducing head for reading out data from a recording medium;

a signal processor for performing a predetermined signal process to the data read by the reproducing head;

a memory for temporarily storing therein the data processed by the signal processor;

a writing operation controller for controlling a writing operation of the signal-processed data into the memory;

a reading operation controller for controlling a reading operation of the data temporarily stored in the memory therefrom;

a first clock generator for extracting a clock synchronized with the drive of the recording medium from the data reproduced from the recording medium;

a second clock generator for generating a stabilized clock; and a controller for controlling both of the signal processor and the writing operation controller on the basis of the first clock generated from the first clock generator, and also for controlling the reading operation controller based upon the stabilized clock generated from the second clock generator.

Also, a decoder circuit, according to another aspect of the present invention, is featured by comprising:

a signal processor for performing a predetermined signal process to data read out from a recording medium based upon a first clock synchronized with an operation of the recording medium;

a memory for temporarily storing therein the data processed by the signal processor;

a writing controller for writing the signal-processed data into the memory on the basis of the first clock; and a reading controller for reading out the data stored in the memory on the basis of a second clock corresponding to a stabilized clock.

Furthermore, the present invention is to provide a recording apparatus equipped with an encoder, and to provide such an encoder that when data to be written into a recording medium is once written into a memory, the data writing operation to the memory is performed on the basis of a stabilized clock, and also the data reading operation from the memory is performed in response to a sync signal recorded on the recording medium.

To this end, a recording apparatus, according to another aspect of the present invention, is featured by comprising:

a data input terminal;

a memory for temporarily storing therein the inputted data;

a write controller for controlling a writing operation of the data into the memory;

a read controller for controlling a reading operation of the data temporarily stored in the memory therefrom;

a signal processor for performing a predetermined signal process to the data read from the memory;

a recording head for recording the data processed by the signal processor on a recording medium;

a first clock generator for extracting a sync signal previously recorded on the recording medium to thereby generate a first clock;

a second clock generator for generating a stabilized clock; and a controller for controlling both of the signal processor and the read controller on the basis of the first clock generated from the first clock generator, and also for controlling the write controller on the basis of the stabilized clock from the second clock generator.

Moreover, an encoder circuit, according to a further aspect of the present invention, is featured by comprising:

a memory for temporarily storing therein inputted data;

a write controller for writing the inputted data into the memory on the basis of a first clock corresponding to a stabilized clock;

a read controller for reading the data stored in the memory on the basis of a second clock synchronized with a drive of a recording medium; and a signal processor for performing a predetermined signal process to the data read by the read controller on the basis of the second clock.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

A description will now be made of an embodiment of the present invention. This embodiment is such a decoder circuit, or an encoder circuit employed in a recording/reproducing apparatus, and is a recording/reproducing apparatus with employment of a magneto-optical disk as a recording medium.

The description will be made in the following order:
1. Conceptional Arrangement of Magneto-optical disk System to which Present Invention is applied.
2. Overall Arrangement of Recording/Reproducing Apparatus.
3. Arrangement of Decoder System.
4. Modified Arrangement of Decoder System.
5. Arrangement of Encoder System.
6. Modified Arrangement of Encoder System.

Figure 4:
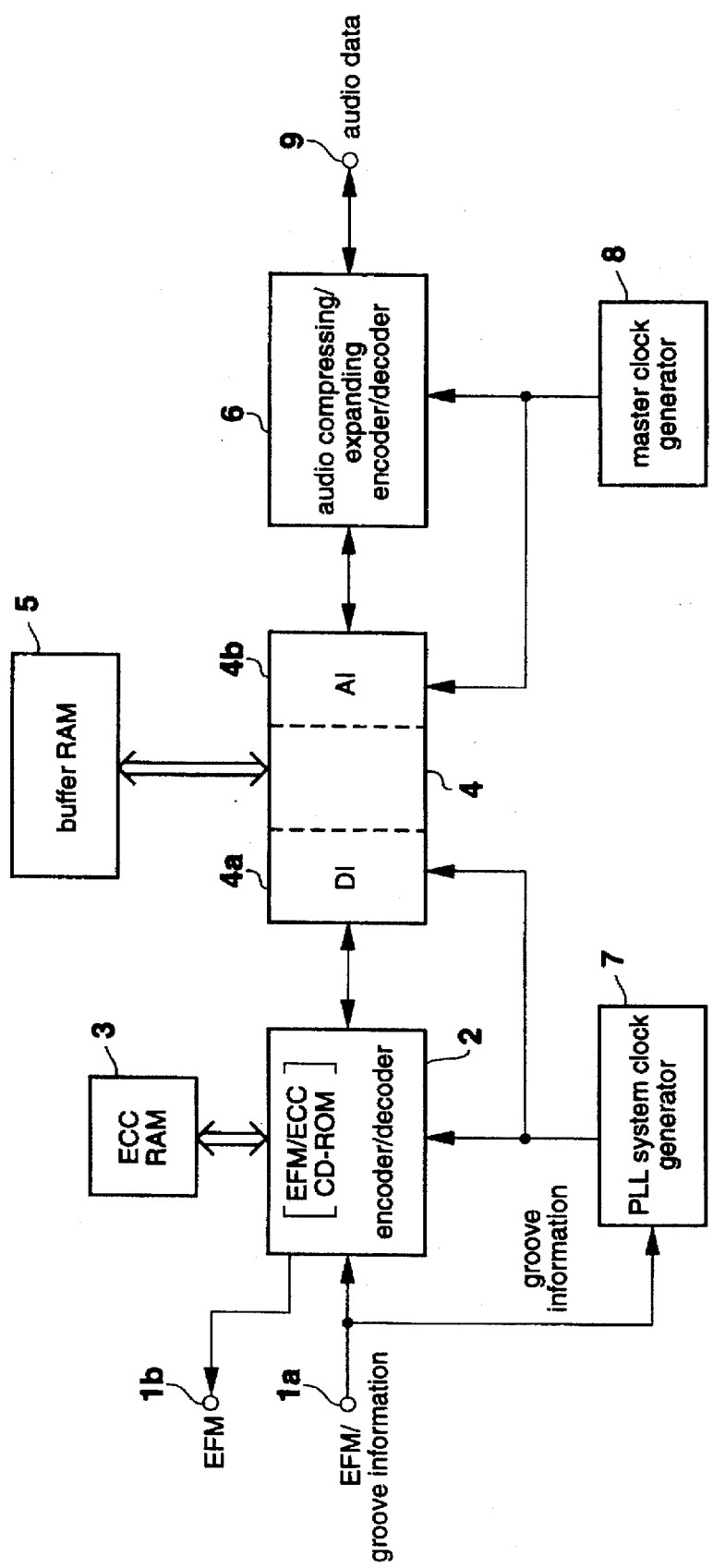
FIG. 4 is a block diagram schematically representing a major arrangement of a decoder and an encoder, which constitute the present invention.

1) Conceptional Arrangement of Magnet Optical Disk System to which Present Invention is applied A data transfer system of a magneto-optical disk system according to an embodiment of the present invention is conceptionally arranged as shown in FIG. 4.

An EFM signal read from the magneto-optical disk by an optical head is supplied from a terminal 1a of FIG. 4 to an encoder/decoder unit 2 during the reproducing operation. In the encoder/decoder unit 2, after the EFM-demodulated data is stored into the ECC-RAM 3, an error correction is performed and a sector decoding operation is carried out.

The data decoded in the encoder/decoder unit 2 is written into a buffer RAM 5 by way of a process-operation by an interface 4a provided on the drive side of a memory controller 4, and is read out from the buffer RAM 5 by way of a process operation by an interface 4b provided on the audio compressing, or audio expanding side thereof. The data read from the buffer RAM 5 is supplied to an encoder/decoder unit 6 for audio compressing/expanding process so as to be audio-expanded. Then, the inverse modified discrete cosine transform is carried out to this data, so that 16-bit quantized digital audio data in the sampling form of 44.1 kHz is supplied to a terminal 9.

During the recording operation, the digital audio data supplied to the terminal 9 is processed by the Modified Discrete Cosine Transform in an audio compressing or expanding encoder/decoder unit 6, so that an amount of the processed data is compressed by approximately ⅕. Then, the processed data is written into the buffer RAM 5 via the process operation of the audio compressing or expanding interface 4b, and is read out from the buffer RAM 5 via the process operation of the drive-sided interface 4a. The data read from the buffer RAM 5 is processed in the encoder/decoder unit 2 by way of the sector encoding operation, the ECC parity encoding operation, and the EFM modulating operation, and then the processed data is supplied from a terminal 1b to a magnetic head.

It should be understood that the groove information which has been previously recorded on the disk, and is read from an optical head during the recording operation is supplied from a terminal 1a to a PLL system clock generating unit 7.

In this embodiment, the clock produced in the PLL system clock generality unit 7 is employed in the processing system defined from the disk to the drive-sided interface 4a, whereas the clock produced from the master clock generality unit 8 is used in the process system defined from the audio compression or expansion sided interface 4b to the terminal 9 for inputting/outputting the data.

That is to say, in the system containing the buffer RAM 5 with a relatively large capacity so as to achieve the shock proof function, a boundary for the used clocks is formed before/after the buffer RAM 5 along the signal stream.

Figure 5:
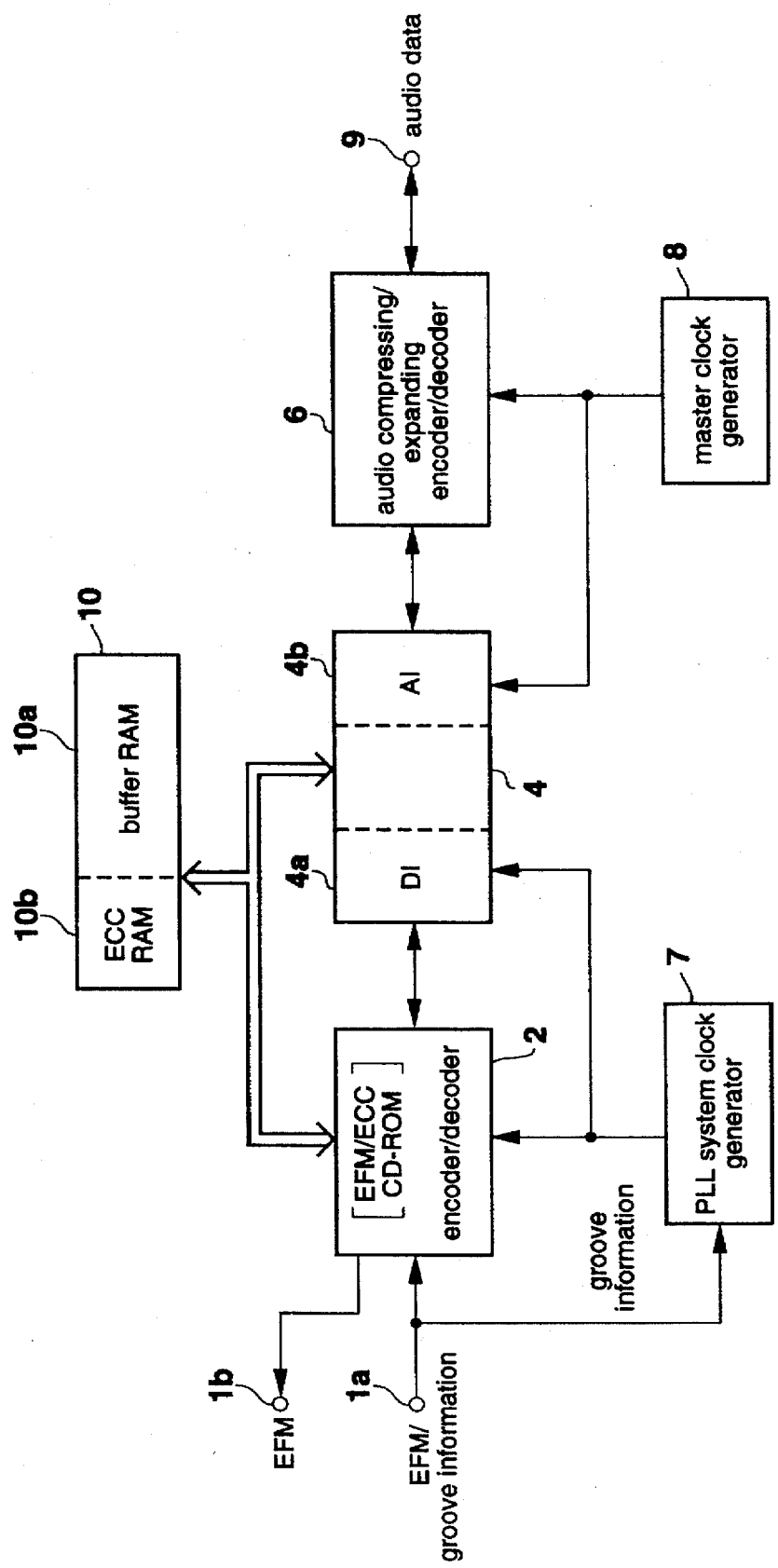
FIG. 5 is a block diagram schematically showing a decoder and an encoder, according to a second embodiment of the present invention.

FIG. 5 schematically represents another conceptional arrangement of the present invention. This conceptional arrangement is so constructed that the buffer RAM 5 and the ECC-RAM 3 shown in FIG. 4 are substituted by a single RAM 10 in an integral form. In other words, an ECC area 10a and a buffer area 10b are prepared in this single RAM 10. With such a structure, the data processing system may be made compact, or manufactured within one chip.

A description will now be made of concrete arrangements, according to embodiments, containing the above-explained conceptional structures as shown in FIG. 4 and FIG. 5.

2) Arrangement of Recording/Producing Apparatus

Figure 6:
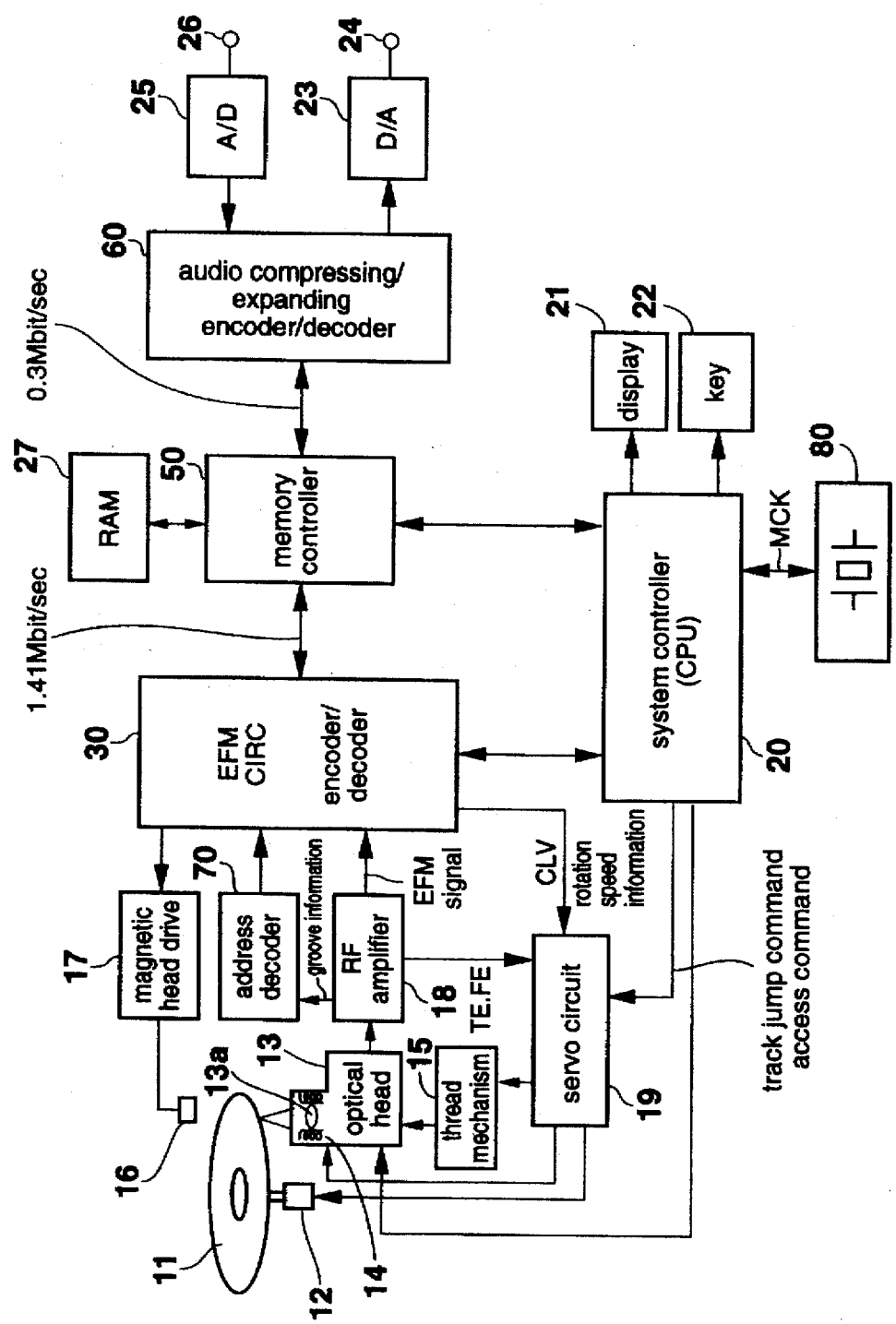
FIG. 6 schematic diagram illustrating an overall arrangement according to the present invention.

In FIG. 6, there is schematically shown an overall arrangement of a recording/reproducing apparatus according to an embodiment of the present invention.

In FIG. 4, for example, audio data has been recorded on a magneto-optical disk 11, and this magneto-optical disk 11 is rotatably driven by a spindle motor 12 during the recording and reproducing operations (namely, recording/reproducing operations).

During the recording/reproducing operations, laser light is illuminated from an optical head 13 onto the rotated disk 11. The optical head 13 outputs high power laser light so as to heat the recording tracks of the disk 11 to the Curie temperature during the recording operation, and outputs laser light having a relatively low level in order to detect the data from the reflection laser light due to the magnetic Kern effect during the reproducing operation. Turning ON/OFF of the laser output, and controlling of the output levels are controlled by a system controller 20.

As a laser output means, a laser diode, such an optical system constructed of a polarizing beam splitter and an objective lens, and also a detector for detecting the reflection laser light are mounted on the optical head 13. The objective lens 13a is held by a two-shaft mechanism 14 in such a manner that this lens can be displaced along the radical direction of the disk 11 and also along the approaching/separating direction of the disk 11.

A magnetic head 16 is located opposite to the optical head 13 with sandwiching the disk 11. The magnetic head 16 is operated to apply to the disk 11, a magnetic field modulated by the data supplied during the recording operation.

The entire optical head 13 and the magnetic head 16 are transportable along the radical direction of the disk 11 by a thread mechanism 15.

The information detected from the disk 11 by the reproducing operation by the optical head 13 is supplied to the RF amplifier 18. The RF amplifier 18 performs the process to calculate the supplied information so as to extract a reproduction RF signal, a tracking error signal, a focus error signal, groove information (absolute positional information FM-modulated on wobbled groove formed on disk 11) and so on.

Thus, the extracted reproduction RF signal corresponds to a so-terminated "EFM signal", namely a binary signal. This EFM signal is supplied to an encoder and decoder unit 30. The tracking error signal and the focus error signal are furnished to a servo circuit 19, and the groove information is supplied to an address decoder 70.

The servo circuit 19 produces various sorts of servo drive signals based upon the tracking error signal and the focus error signal, and also a track jump instruction, an access instruction, and rotation speed detection information (CLV servo signal), which are derived from a system controller 20 constructed by a microcomputer. The servo circuit 19 controls the 2-shaft mechanism 14 and the thread mechanism 15 so as to perform the focus control and the tracking control. Also, the servo circuit 19 controls the spindle motor 12 at constant linear velocity.

In the address decoder 70, the groove information is injected into the PLL circuit to thereby produce the PLL groove clock in synchronism with the disk rotation. The address decoder 70 detects the groove sync by employing the PLL groove clock, and also demodulates the groove address.

The groove sync and the groove address are furnished via the encoder/decoder unit 30 to the system controller 20. It should be noted that the PLL groove clock, the groove sync, and the groove address correspond to signals used during the recording operation.

The reproduction RF signal is supplied to the encoder/decoder unit 30, so that the data decode and sub-code are extracted, the address recorded as the data is extracted, and the PLL data clock synchronized with the EFM signal is generated.

The sub-code information and the address information are supplied to the system controller 20.

With respect to the CLV servo control of the spindle motor, the PLL data clock is utilized during the reproducing operation, whereas the PLL groove clock is employed during the recording operation.

The reproduction RF signal functioning as audio data is processed by the encoder/decoder unit 30 in accordance with the EFM demodulation, the CIRC (Cross Interleaved Reed Solomon Coding) error correction, and the sector decoding operation. Thereafter, the processed signal is once written into a buffer RAM 27 by the memory controller 50. It should be noted that the data is read from the disk 11 by the optical head 13, and also the data is transferred from the optical head 13 to the buffer RAM 27 at speed of 1.41 Mbit/sec, and further these data reading and data transferring operations are intermittently performed.

The data written into the buffer RAM 27 is read out therefrom at such a timing that the transfer speed of the reproduced data becomes 0.3 Mbit/sec, and then is supplied to an audio compressing/expanding encoder/decoder 60. Then, the audio signal which has been processed by the modified discrete cosine transform to be compressed and recorded on the disk is processed in accordance with the inverse modified discrete cosine transform. Then, the processed signal is converted into an analog signal by a D/A converter 23, and this analog signal is supplied from an output terminal 24 to a predetermined amplifier circuit unit in order to be reproduced. For example, this reproduced signal is outputted as analog audio signals for right and left channels.

The data writing/reading operations into/from the buffer RAM 27 are performed by designating the addresses by controlling a write pointer and a read pointer by a memory controller 50. As previously explained, the write pointer (write address) is incremented at a timing of 1.41 Mbit/sec, whereas the read pointer (read address) is incremented at a timing of 0.3 Mbit/sec. Since there is a difference between the writing bit rate and the reading bit rate, a certain amount of data is stored within the buffer RAM 27. When a complete capacity of data have been stored within the buffer RAM 27, increment of the write pointer is stopped and the data reading operation from the disk 11 by the optical head 13 is also stopped. However, since increment of the reading pointer is continuously performed, the audio output signal is reproduced without any interruption.

Assuming now that only the data reading operation from the buffer RAM 27 is continuously executed and the data storage amount of the buffer RAM 27 becomes below a predetermined data amount at a certain time instant, both of the data reading operation by the optical head 13 and increment of the write pointer are restarted, so that the data is again stored into the buffer RAM 27.

As described above, since the audio signal is outputted through the buffer RAM 27, even when the tracking operation by the optical head is disturbed due to, e.g., disturbances, and thus the continuous signal reproduction from the optical disk is interrupted, the audio signal reproducing operation is not interrupted. While the data is still stored in the buffer RAM 27, for instance, the optical head is accessed to the correct tracking position in order to restart the data reading operation. As a consequence, the operation can be continued without giving any adverse influences to the audio signal reproduction. In other words, the shock proof function of the recording/reproducing apparatus could be considerably improved.

On the other hand, when the recording operation is executed to the disk 11, the recording signal (analog audio signal) supplied to the input terminal 26 is converted into digital data by an A/D converter 25, and thereafter, this digital data is supplied to the audio compressing/expanding encoder/decoder unit 60 so as to be processed by way of the audio compression process (modified discrete cosine transform).

The recording data compressed by the audio compressing/expanding encoder/decoder unit 60 is once written into the buffer RAM 27 by the memory controller 50, and is read therefrom at a preselected timing, and then the read recording data is supplied to the encoder/decoder unit 30. For instance, at such a time instant when the data stored in the buffer RAM 27 becomes a preselected data amount exceeding 1 cluster, the data is read out from the buffer RAM 27, which will then be transferred to the encoder/decoder unit 30.

In the encoder/decoder unit 30, such process operations as the sector encoding, CIRC encoding (parity adding), and the EFM modulation are carried out to this recording audio data, and thereafter, the processed recording audio data is supplied to a magnetic head drive circuit 17.

In response to the recording data (EFM signal) encoded, the magnetic head drive circuit 17 supplies a magnetic head drive signal to a magnetic head 16. In other words, the magnetic head drive circuit 17 causes the magnetic head 16 to apply either the N-pole field, or the S-pole field to the disk 11. At this time, the system controller 20 furnishes a control signal to the optical head such that a laser light having a high recording level is outputted from the optical head. As a consequence, the audio data entered into the input terminal 26 may be recorded on the disk 11.

In the recording/reproducing apparatus, a display unit 21 is provided which displays mode conditions and operation conditions during the recording operation or the reproducing operation, and further program numbers, time information, character information recorded on the disk 11. The display unit 21 is constructed of, for instance, a liquid crystal display, whose operation is controlled by the system controller 20.

Also, an operation unit 22 is provided on the recording/reproducing apparatus, by which the user executes various operations. In the operation unit 22, there are employed a recording key, a reproducing key, a stop key, an AMS (auto music scan) key, and a search key for user operations.

A clock generating unit 80 of the crystal oscillator system is employed so as to operate the system controller 20 and the like. The master clock MCK generated from the clock generating unit 80 is supplied to the system controller 20 and also to various circuit elements via this system controller 20.

When either the recording operation, or the reproducing operation is performed with respect to the disk 11, the management information, namely P-TOC (Premastered Table of Content) and U-TOC (User Table of Content) recorded on the disk 11 must be read out. The system controller 20 discriminates an address of an area to be recorded on the disk 11 from an address of an area to be reproduced on the basis of the above-described management information. This management information is held in the buffer RAM 27. As a result, a buffer area for storing the above-described recording data, or reproducing data, and an area for storing the management information thereof are subdivided and set in the buffer RAM 27.

Then, the system controller 20 reads the management information by reproducing the recording track at the innermost peripheral portion of the disk, on which the management information has been recorded when the disk 11 is loaded. The read management information is stored in the buffer RAM 27, so that when the recording or reproducing operation is subsequently performed to the disk 11, this management information may be referred.

As is known, U-TOC is edited to be rewritten in connection with the data recording operation and the data erasing operation. The system controller 20 executes this editing process to the U-TOC information stored in the buffer RAM 27 every time the recording operation and the erasing operation is performed. In response to this rewriting operation, the U-TOC area of the disk 11 may be rewritten at a preselected timing.

3) Arrangement of Decoder System

Figure 7:
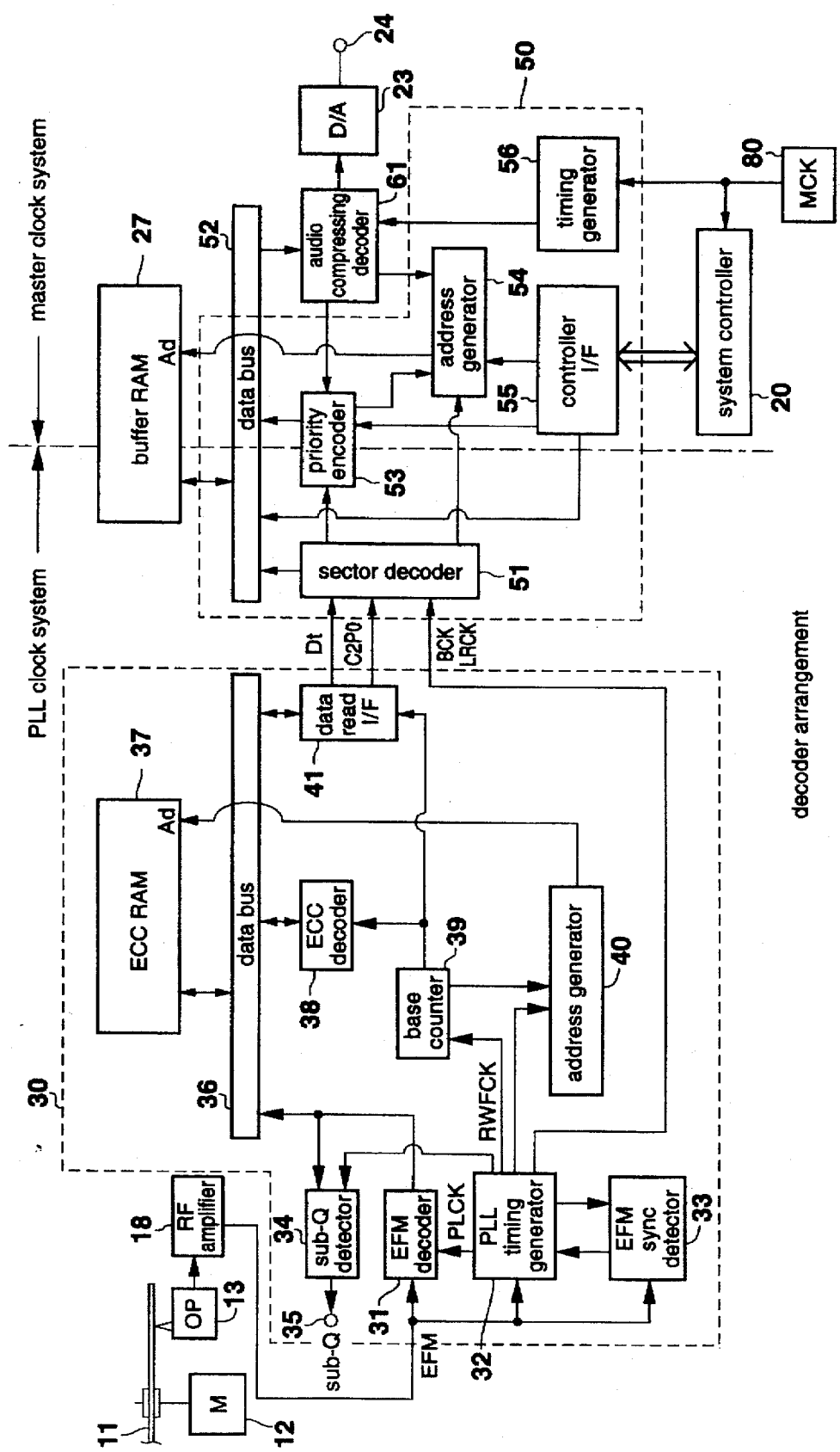
FIG. 7 is a schematic diagram for showing a decoder according to a first embodiment, which constitutes the present invention.

In FIG. 7, there is shown a detailed block diagram of a decoder system functioning during the reproducing operation, employed in the above-described recording/reproducing apparatus.

That is, FIG. 7 represents detailed arrangements of the encoder/decoder unit 30, the memory controller 50, and the audio compressing/expanding encoder/decoder unit 60 among the overall arrangement of FIG. 6.

As the constructural elements included in the encoder/decoder unit 30 of FIG. 6 within the decoder system shown in FIG. 7, there are an EFM decoder 31, a PLL timing generator 32, an EFM sync detecting unit 33, a sub-code detecting unit 34, a terminal 35, a data bus 36, an ECC-RAM 37, an ECC decoder 38, a base counter 39, an address generator 40, and a data read interface 41.

As the constructural elements contained in the memory controller 50, there are a sector decoder 51, a data bus 52, a priority encoder 53, an address generator 54, a controller interface 55, and a timing generator 56.

Furthermore, as the structural elements included in the audio compressing/expanding encoder/decoder unit 60, there is an audio compressing decoder 61.

A description will now be made of such a decoder system.

During the reproducing operation, while the disk 11 is rotated by the spindle motor 12 at a constant linear velocity, the laser light is illuminated onto the disk from the optical head 13.

The optical head 13 outputs the reflection light detecting signal from the disk 11 to the RF amplifier 18, and the RF amplifier 18 extracts the reproduction RF signal from the reflection light detection signal. The digitalized reproduction RF signal is a so-called "EFM signal" which corresponds to the reproduced data from the disk 11.

This EFM signal is supplied to the EFM decoder 31, the PLL timing generator 32, and the EFM sync detecting unit 33.

The EFM sync detecting unit 33 detects a sync pattern within the EFM signal frame. The PLL timing generator 32 detects an edge of the EFM signal, and then this edge detected outputs is injected into the PLL circuit to produce a PLL data clock PLCK. This PLL data clock PLCK is synchronized with the rotation of the disk 11, and therefore is such a clock containing the rotation jitter component of the disk 11.

Furthermore, the PLL timing generator 32 generates various sorts of timing signals based upon the PLL data clock PLCK and the EFM sync.

The EFM decoder 31 performs the EFM demodulating process with employment of the PLL data clock PLCK, and transfers EFM-demodulated data to a data bus 36. The sub-code information is extracted from the EFM-modulated data by a sub-code detecting unit 34, and then is supplied from the terminal 35 to the system controller 20.

The data which has been EFM-demodulated and transferred to the data bus 36 is written into the ECC-RAM 37. For this data writing operation, a read, or write frame clock RWFCK is generated from the PLL timing generator 32 in response to the PLL data clock PLCK, and is counted by the base counter 39. The address generating operation in the address generator 40 is controlled by the PLL timing generator 32 to thereby produce an interleave, or scramble effect address.

Then, the EFM-demodulated data is written into the ECC-RAM 37 at a certain phase timing (base counter value) managed by the read or write frame clock RWFCK based upon the write address generated from the address generator 40.

On the other hand, the ECC decoder 38 reads the data from the ECC-RAM 37 to perform the deinterleave, or error correcting process. The reading operation from this ECC-RAM 37 is also managed by the read, or write frame clock RWFCK. In other words, the read command is issued by the ECC decoder 38 at a phase timing (base counter value)

different from the phase timing for the writing operation by the read, or write frame clock RWFCK. The data is read from the ECC-RAM 37 based on the read address generated from the address generator 40.

The data Dt error-corrected by the ECC decoder 38 is transferred via the data bus 36 from the data read interface unit 41 to the sector decoder 51 at a certain timing (base counter value) managed also by the read/write frame clock RWFCK. Also, the discrimination information C2PO used when no error correction is carried out is transferred.

Furthermore, a bit clock BCK and an LR clock LRCK synchronized with the data Dt is supplied from the timing generator 32 to the sector decoder 51. That is, the sector decoder 51 is also operated in response to the PLL data clock.

In the sector decoder 51, a so-called "CD-ROM format" is decoded and the decoded format is transferred to a data bus 52.

The data read and write operations to the buffer RAM 27 are carried out on the basis of the demand selection by the priority encoder 53 and the address generation by the address generator 54. To the priority encoder 53, the write command is issued from the sector decoder 51, the read command is issued from the audio compression decoder 61, and either the write command, or the read command is issued from the system controller 20 via the control interface 55. As previously explained, since the data transfer rate at which the data is written into the buffer RAM 27 is higher than the data transfer rate at which the data is read out from the buffer RAM 27, normally, the priority encoder 53 selects the write command issued from the sector decoder 51, or the read command issued form the audio compression decoder 61 in order to adjust a difference between the data transfer rates.

After the data transferred from the sector decoder 51 to the data bus 52 has been written into the buffer RAM 27, this data is read in response to the read demand issued from audio compression decoder 61, and then is supplied via the data bus 52 to the audio compression decoder 61.

It should be understood that the operations subsequent to the data reading operation from the buffer RAM 27 are carried out under timing control by the timing generator 56 in synchronism with the master clock MCK.

In the audio compression decoder 61, the Inverse Modified-Discrete Cosine Transform audio compressing process is carried out to the read data, So that this read data is transformed into such digital data with 16-bit quantizing bits and the sampling frequency of 44.1 kHz. This digital data is D/A-converted by a D/A converter 23 into an analog signal which will then be outputted from the terminal 24 as a reproduced audio signal.

In the case of the decoder system according to this embodiment, the process operations executed until the data is written into the buffer RAM 27 are carried out on the basis of the PLL data clock PLCK, whereas the process operations after the data is read from the buffer RAM 27 are carried out on the basis of master clock MCK.

That is to say, the process operations up to the EFM decoding, the deinterleaving, the error correcting, the data transfer, the sector decoding, and the data writing into the buffer RAM 27 correspond to the signal processing operation in synchronism with the rotation of the disk 11. As a result, in this processing system, as long as the PLL circuit within the PLL timing generator 32 is locked, this processing system can be completely free from jitter components. No idea to employ the jitter margin is required.

As a consequence, a so-called "jitter margin area" is required in the ECC-RAM 37. Furthermore, only the slot is allocated with respect to the read/write accesses to the ECC-RAM 37, and no adjustment is needed by considering the jitter component, so that a simpler control can be achieved. In other words, as apparent from the comparison result with FIG. 2, the priority encoder 112 for accessing to the ECC-RAM 111 is no longer required. Also, the two independent base counters 113 and 115 are not required to the write control and the read control, but only one base counter 39 is required.

Figure 1A:
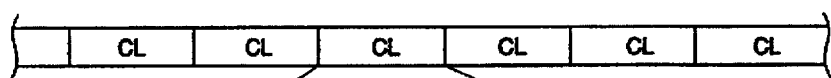
FIG. 1A is a schematic diagram for showing a cluster unit of data recorded on a disk.
Figure 1B:
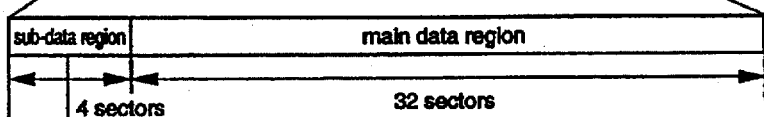
FIG. 1B is a schematic diagram for indicating a data structure in which the above-explained cluster unit is arranged by a plurality of sectors.
Figure 1C:
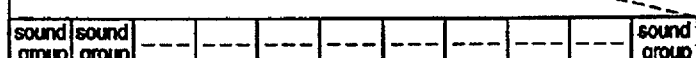
FIG. 1C is a diagram schematically representing a data structure of a sound frame.
Figure 1D:
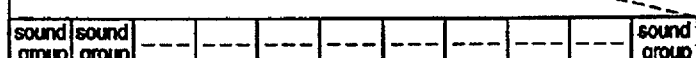
FIG. 1D is a schematic diagram indicating that the above-mentioned sound frame is constructed of the plural sound frames.
Figure 1E:
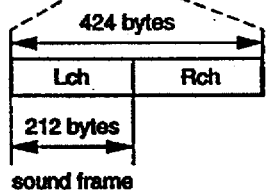
FIG. 1E is a diagram schematically showing a data structure of a sound group.
Figure 2:
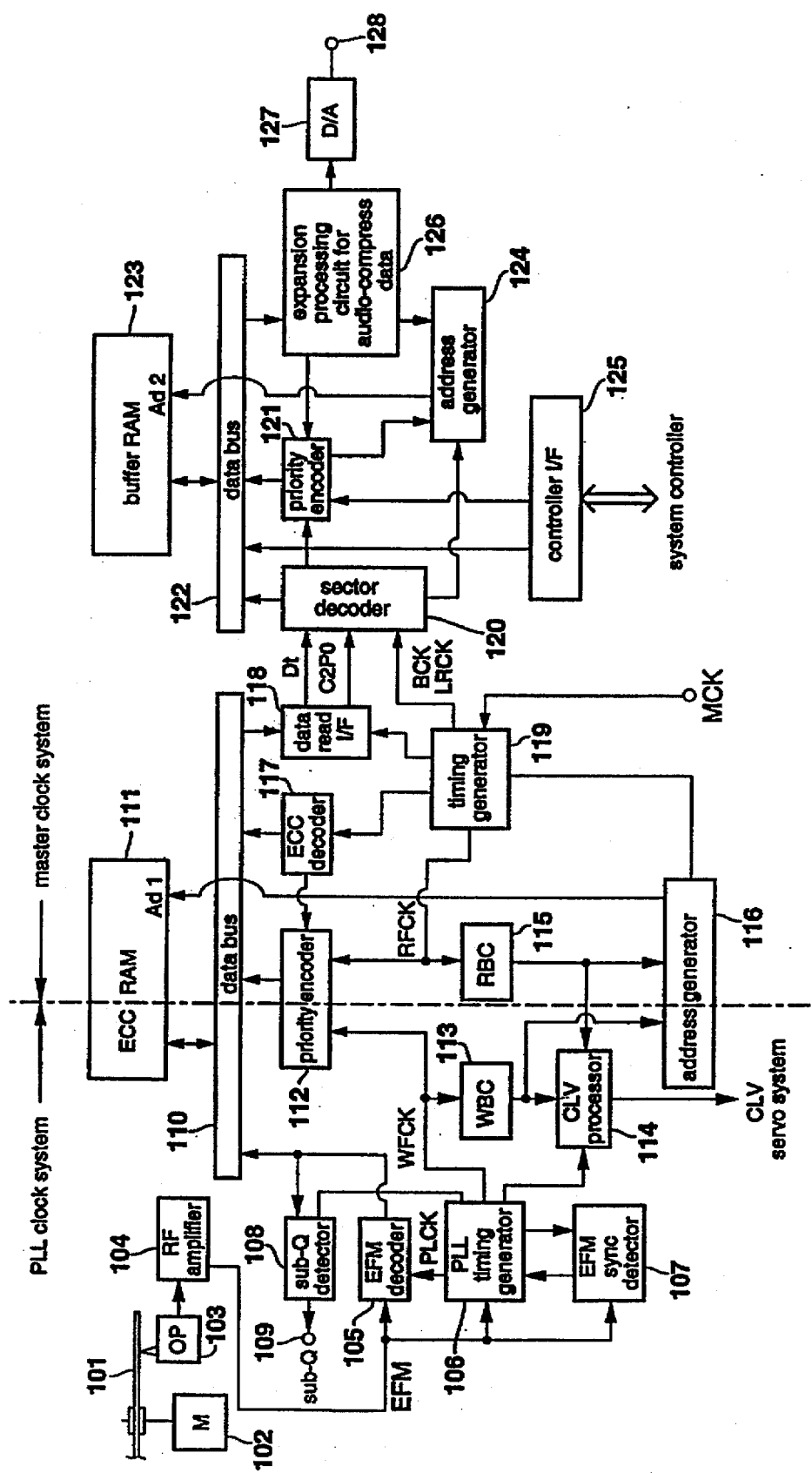
FIG. 2 is a schematic block diagram of the conventional reproducing apparatus.

In this embodiment, the boundary between the two clock systems corresponds to the buffer RAM 123 as shown in FIG. 2. Originally, the buffer RAM 123 owns a relatively large memory capacity such as 4Mbits in order to achieve the shock proof function. There is substantially no adverse influence by the jitter between these two clock systems. In other words, there is substantially no adverse influence by the jitter on the time base caused by the rotational fluctuations of the disk 11.

Since the adverse influence of the jitter between the different clocks need not be reflected to the CLV servo system, the CLV processor 114 as shown in FIG. 2 is no longer employed. Furthermore, as the operation of the CLV servo system, the wide CLV servo range for the rotation of the spindle motor 12 is not required, but if the error is present within the locking range of the PLL circuit, then such a system capable of allowing the constant deviation can be realized. As a consequence, there is no need to increase the servo gain or to widen the servo range by taking account of the adverse influence by the jitter component, and therefore, the power saving can be achieved.

4) Modified Arrangement of Decoder System

Figure 8:
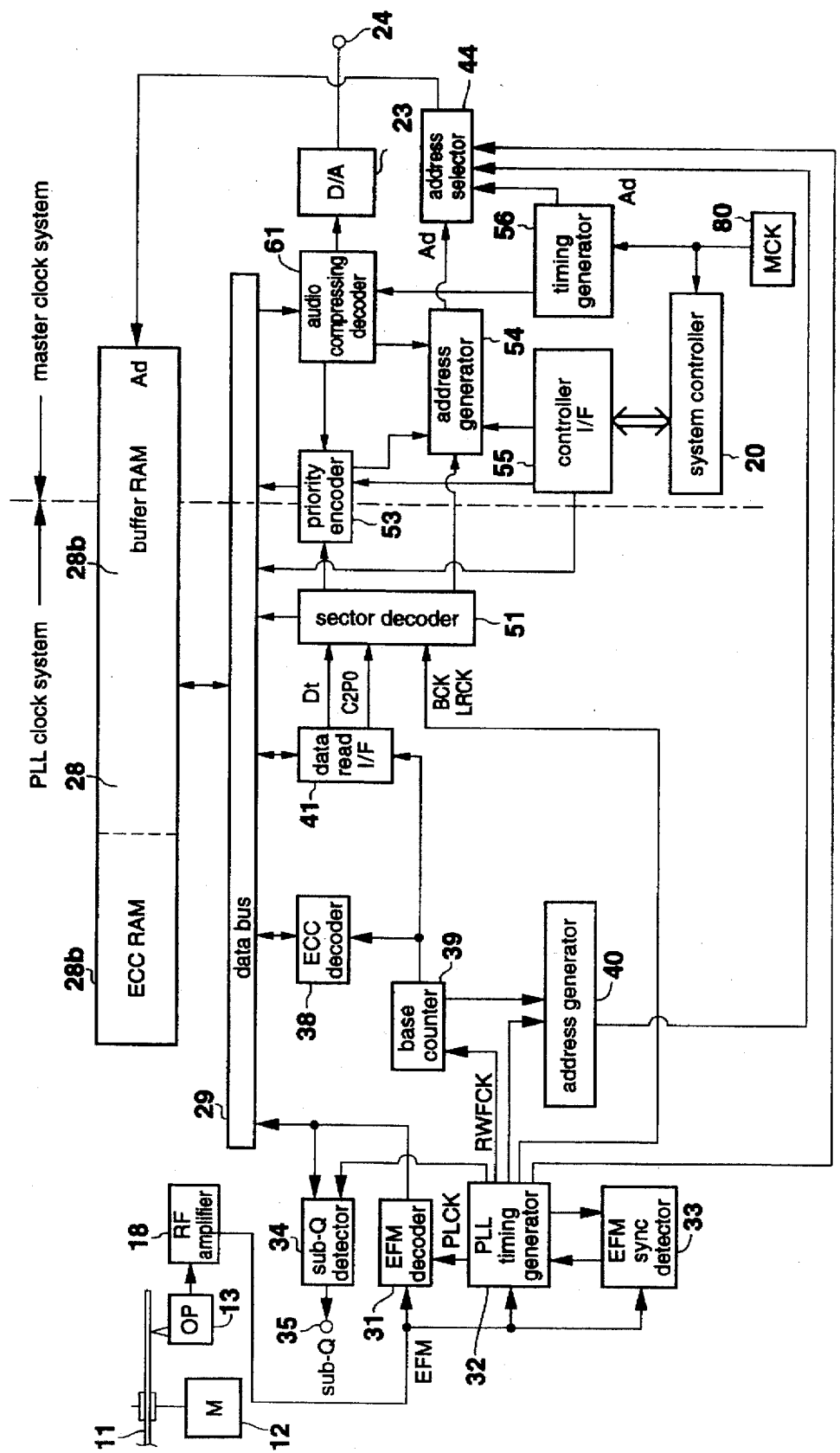
FIG. 8 is a schematic diagram for showing a decoder according to a second embodiment, which constitutes the present invention.

FIG. 8 schematically shows a modified arrangement of a decoder system. It should be noted that the same reference numerals shown in FIG. 7 will be employed as those for denoting the same circuit components of this modification, and explanations thereof are omitted.

In this modification, a RAM 28 is employed. This RAM 28 is constructed by combining the ECC-RAM 37 with the butter RAM 27 in FIG. 7. In the RAM 28, there are provided a buffer RAM area 28b for storing therein data used to realize a shock proof function, and an ECC-RAM area 28a used in the ECC process.

An address to the RAM 28 is generated from the address generator 40 in correspondence with the ECC-RAM area 28a, and also is generated from the address generator 54 in correspondence with the buffer RAM area 28b. Then, an access address is selected by an address selecting unit 44 under control of the PLL timing generator 32 for the PLL data clock system and the timing generator 56 for the master clock system, and then the selected access address is supplied to the RAM 28.

With such an arrangement, since the RAM 28 is equipped with the data buffer function and the ECC data holding function, it is possible to reduce the memory chips with respect to the circuit packaging. Also, the encoder/decoder unit 30, the memory controller 50, and the audio compressing/expanding encoder/decoder 60 shown in FIG. 6 are preferably manufactured in one chip.

In particular, in the arrangement explained in FIG. 7, only one priority encoder for the RAM accessing operation is required in the processing system. From this point of view, both of the ECC RAM area 28a and the buffer RAM area 28b may be easily combined in an integral form as illustrated in FIG. 8.

5) Arrangement of Encoder System

Figure 9:
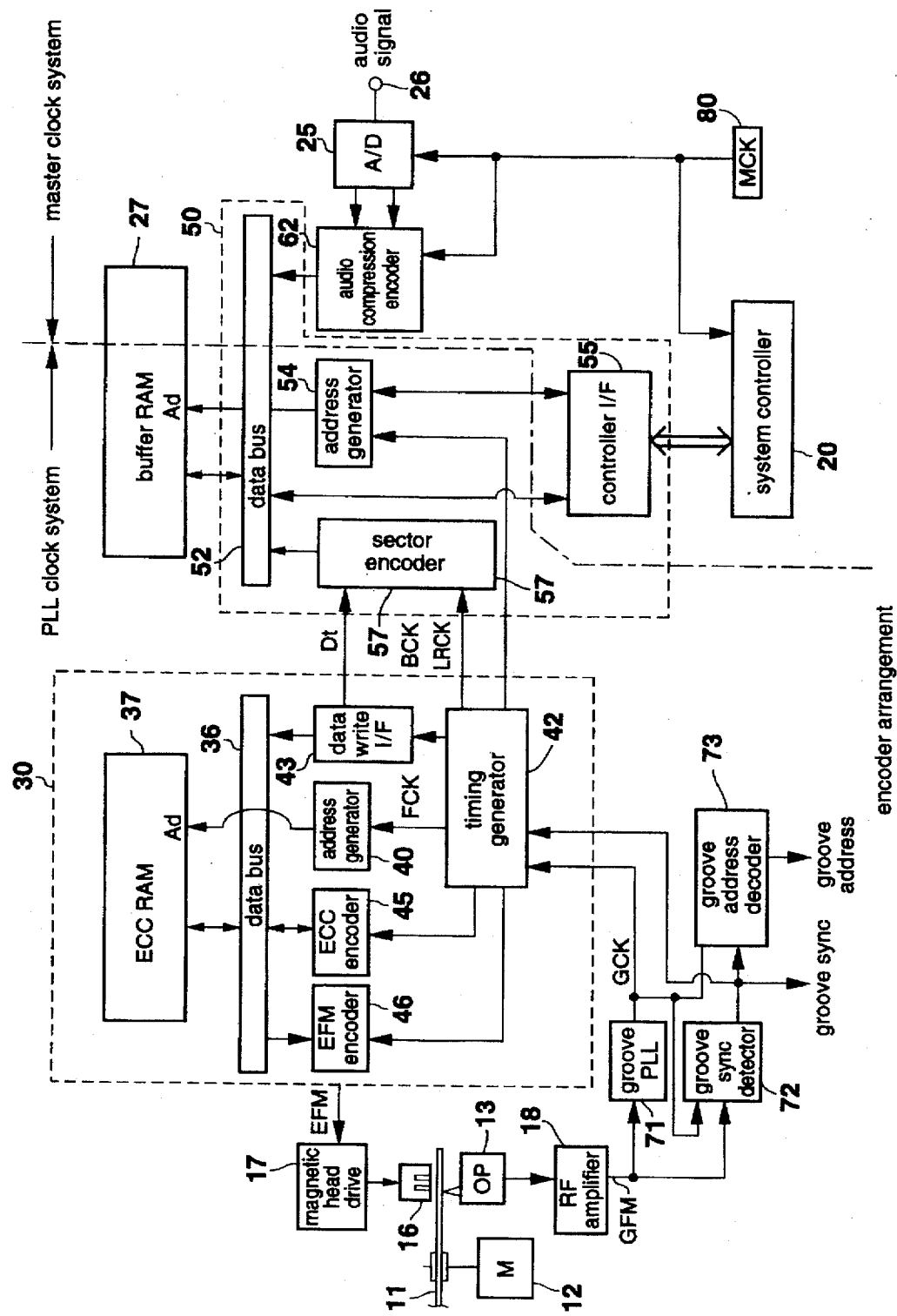
FIG. 9 is a schematic diagram for showing an encoder according to a first embodiment, which constitutes the present invention.

Next, a description will now be made of the encoder system operable during the recording operation in the recording/reproducing apparatus shown in FIG. 6. A detailed arrangement of this encoder system is represented in FIG. 9. In FIG. 9, there are shown detailed arrangements as to the encoder/decoder unit 30, the memory controller 50, the audio compressing/expanding encoder/decoder 60, and the address decoder 70 among the arrangements of FIG. 6.

As the constructural elements contained in the encoder/decoder unit 30 of FIG. 6 in the encoder system shown in FIG. 9, there are provided the data bus 36, the ECC-RAM 37, the address generator 40, the timing generator 42, the data read interface 43, the ECC encoder 45, and the EFM encoder 46.

Also, as the constructural elements contained in the remote controller 50, there are employed the data bus 52, the address generator 54, the controller interface 55, and the sector encoder 57.

Furthermore, as the structural elements contained in the audio compressing/expanding encoder/decoder unit 60, there is provided the audio compression encoder 62.

As the structural elements included in the address decoder 70, there are employed a groove PLL circuit 71, a groove sync detecting unit 72, and a groove address decoder 73.

Operations of such an encoder system will now be explained.

During the recording operation, an audio signal entered from an input terminal 26 is converted by the A/D converter 25 with employing the master clock MCK into 16-bit quantized digital data of sampling with 44.1 kHz. Then, this digital data is supplied into the audio compression encoder 62 in which a data amount thereof is compressed by approximately ⅕.

The audio-compressed data is written via the data bus 52 into the buffer RAM 27 in response to the write command issued from the audio compressing encoder 132. The read/write addresses to the buffer RAM 27 are generated by the address generator 54 based upon the control of the timing generator 42 and the control by the system controller 20 via the controller interface 55.

In this embodiment, the A/D conversion by the A/D converter 25, the audio compression encoding operation by the audio compression encoder 62, and the write operation to the buffer RAM 27 are carried out in response to the master clock MCK generated from the clock generating unit 80.

During the recording operation, when an amount of data stored in the buffer RAM 27 reaches a predetermined amount exceeding 1 cluster, data is read from the buffer RAM 27 and the data is transferred to a sector encoder 57.

In the sector encoder 57, the encode process in the sector form is carried out by using the bit clock BCK and the LR clock LRCK supplied from the timing generator 42, and then the encoded data is transferred to the data write interface 43. The data transferred to the data write interface 43 is written via a data bus 36 into the ECC-RAM 37.

A read/write address to the ECC-RAM 37 is generated from the address generator 40 in response to the frame clock FCK produced from the timing generator 42.

The ECC encoder 45 reads the data stored in the ECC-RAM 37 to be processed by adding the parity bit thereto.

The data which has been processed in the ECC encoder 45 is transferred to the EFM encoder 46 in order to be EFM-modulated (eight-to-fourteen modulation). This EFM signal is sent to the magnetic head drive circuit 17, and then the magnetic head 16 applies a magnetic field to the disk 11 in response to the EFM signal.

During such a recording operation, in the rotation control system of the disk 11, the various process operations are performed on the basis of the clock produced by employing the PLL circuit in synchronism with the rotation of the disk 11.

Laser is illuminated onto the disk 11 rotated by a spindle motor 12 by an optical head 13, and reflection light information is supplied to an RF amplifier 18.

In a recordable magneto-optical disk, the recording tracks have been previously formed by way of so-called "groove". Moreover, the absolute positional information (address information) is wobbled on this groove (namely, wobbling process) in accordance with the FM modulating process with employment of the carrier of 22.0±1 kHz. In the RF amplifier 18, such FM-modulated groove information GFM is extracted. This groove information GFM is supplied to a groove PLL circuit 71, so that a PLL groove clock GCK is produced in synchronism with this groove information GFM.

The groove information GFM is supplied to a groove sync detecting unit 72 by which a sync detection is performed with employment of the PLL groove clock GCK. In a groove address decoder 73, an address decoding process is executed with employment of the PLL groove clock GCK, so that the groove address information is demodulated. Both of the groove sync and the groove address are supplied to the system controller 20.

In the case, both of the PLL groove clock GCK and the groove sync are supplied to the timing generator 42. The timing generator 42 is so arranged as to be operable while using the PLL groove clock GCK as the reference clock.

As a result, in the process system defined from the data reading operation from the buffer RAM 27 to the magnetic head 16, the operations are carried out on the basis of the PLL groove clock GCK produced in synchronism with the rotation of the disk 11.

As explained before, in the case of the encoder system according to this embodiment, the process operations up to the data writing operation into the buffer RAM 27 are performed in response to the master clock MCK, whereas the process operations after the data reading operation from the buffer RAM 27 are carried out on the basis of the PLL groove clock GCK.

In other words, the various process operations such as the data reading operation from the buffer RAM 27, the sector encoding operation, the data transfer operation, the parity bit addition, the interleaving operation, and the EFM encoding operation are the signal processing operation in synchronism with the rotation of the disk 11. As a result, in this process system, as long as the PLL circuit within the groove PLL circuit 71 is locked, the encoding system is completely free from the jitter problem.

Figure 3:
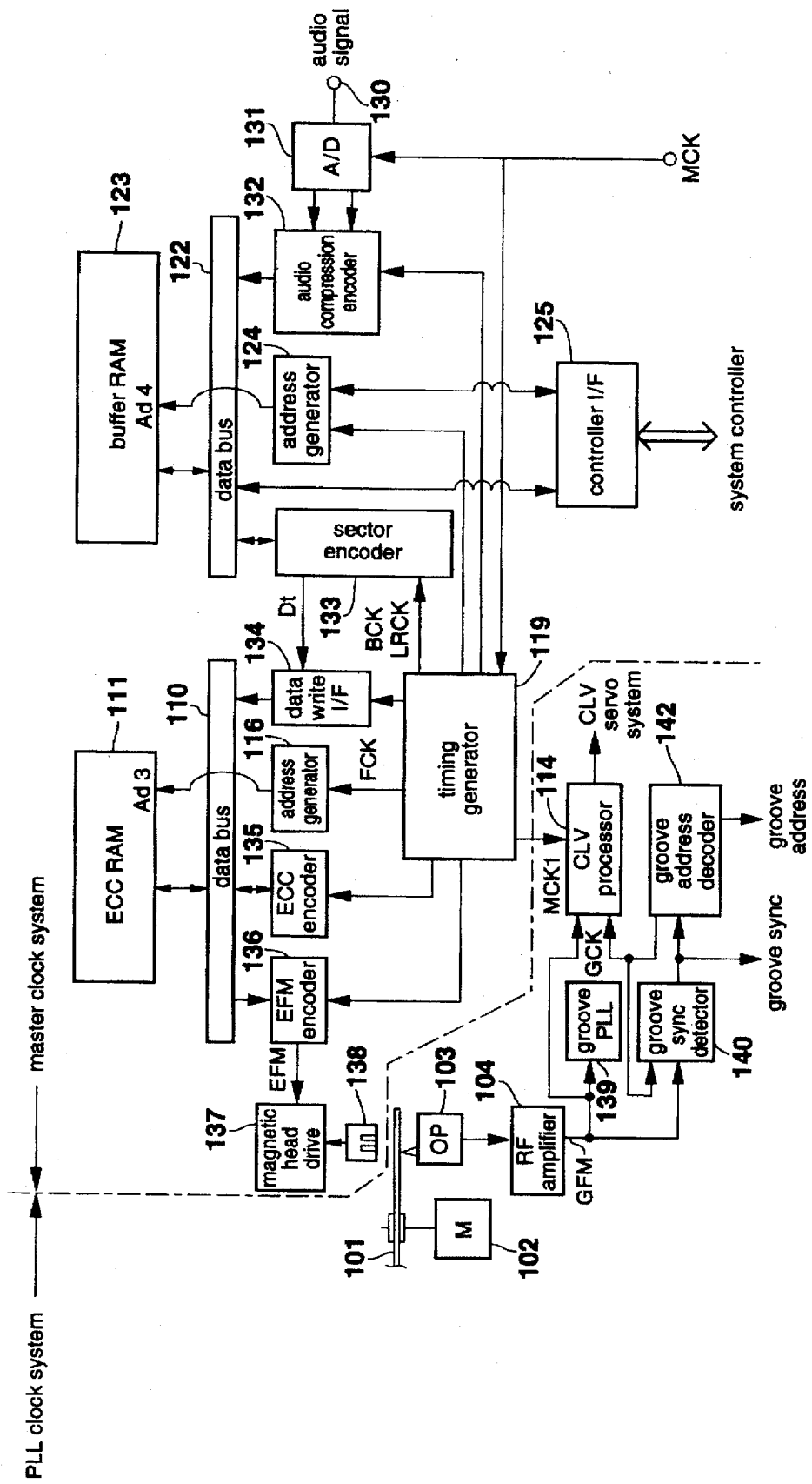
FIG. 3 is a schematic block diagram of the conventional recording apparatus.

Also, since the adverse influences by the jitter components between both of the clocks, namely the frequency/phase error components between the master clock MCK and the PLL groove clock GCK need not be reflected to the CLV servo system, no longer such a CLV processor 114 as shown in FIG. 3 is employed. Furthermore, as the operation of the CLV servo system, the wide CLV servo range for the rotation of the spindle motor 12 is not required, but if the error is present within the locking range of the PLL circuit, then such a system capable of allowing the constant deviation can be realized. As a consequence, there is no need to increase the servo gain or to widen the servo range by taking account of the adverse influence by the jitter component, and therefore, the power saving can be achieved.

6) Modified Arrangement of Encoder System

Figure 10:
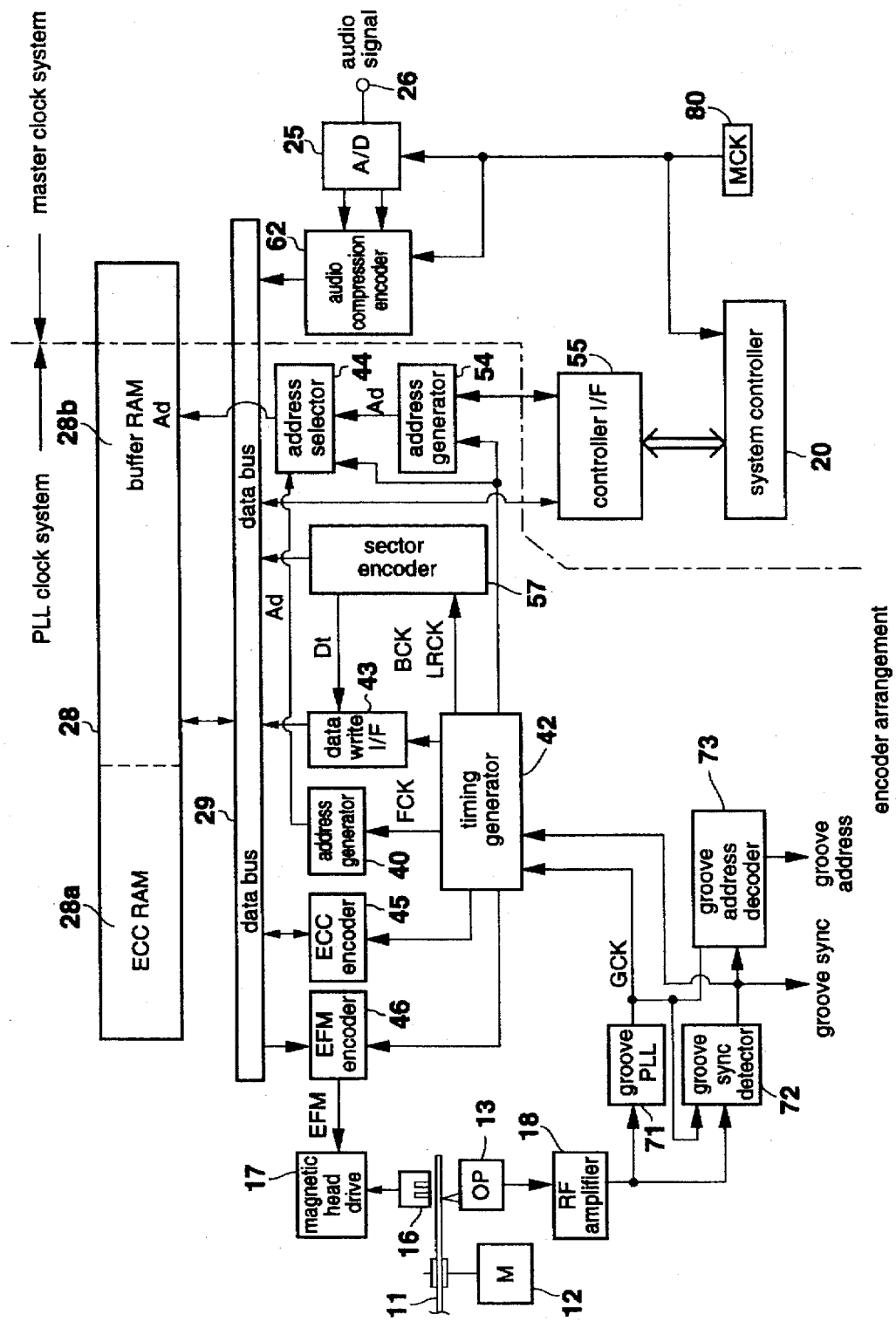
FIG. 10 is a schematic diagram for showing an encoder according to a second embodiment, which constitutes the present invention.

FIG. 10 schematically shows a modified arrangement of an encoder system. It should be noted that the same reference numerals shown in FIG. 9 will be employed as those for denoting the same circuit components of this modification, and explanations thereof are omitted.

In this modification, a RAM 28 is employed. This RAM 28 is constructed by combining the ECC-RAM 37 with the buffer RAM 27 in FIG. 9. In the RAM 28, there are provided a buffer RAM area 28b for storing therein data used to realize a shock proof function, and an ECC-RAM area 28a used in the ECC process.

An address to the RAM 28 is generated from the address generator 40 in correspondence with the ECC-RAM area 28a, and also is generated from the address generator 54 in correspondence with the buffer RAM area 28b. Then, an access address is selected by an address selecting unit 44 under control of the PLL timing generator 42 for the PLL groove clock system and of the system controller 20 and then the selected access address is supplied to the RAM 28.

With such an arrangement, since the RAM 28 is equipped with the data buffer function and the ECC data holding function, it is possible to reduce the memory chips with respect to the circuit packaging. Also, as shown in FIG. 6, the encoder/decoder unit 30, the memory controller 50, and the audio compressing/expanding encoder/decoder unit 60 and the address decoder 70 are preferably manufactured in one chip.

It should be understood that although the above-described embodiments have described that the present invention has been applied to the magneto-optical disk recording/reproducing apparatus, the present invention may be alternatively applied to a CD player and a DAT player, which are equipped with a buffer RAM used to a so-called "shock proof" function. In particular, in the case of a CD system having no conceptional idea of a sector, as to a data transfer process between a decode system and a buffer RAM, very cumbersome process operations are required in order to correctly continue the data by eliminating the adverse influence of the jitter problem. Since the operations up to the data writing operation to the buffer RAM are performed in synchronism with the PLL system, no care should be taken to the jitter adverse influence. Accordingly, for instance, the write timing to the buffer RAM and the like may be readily produced in accordance with, for instance, a sub-code.

As previously described, in the reproducing apparatus and the decoder circuit, according to the present invention, the PLL system clock is used in the system defined from the recording medium up to the data writing operation into the buffer RAM, whereas the clock of the crystal oscillator system is employed in the system defined by the data reading operation from the buffer RAM. As a consequence, as long as the PLL lock is maintained within the decode means and the write control means, the system can be free from the jitter problem, and also the jitter margin area is no longer required in the memory used to the decoding process. Furthermore, with respect to the access control to the memory used to the decoding process, neither the priority encoder and other circuit portions as the managing means for the adverse influence of the jitter, nor the CLV processor circuit for reflecting the adverse influence of the jitter to the rotation servo system are required.

As apparent from these facts, no overflow of the memory used to execute the decoding process by the jitter occurs, so that the stable decoding operation can be considerably improved.

As to the adverse influence of the jitter occurred between the different clock systems, this adverse influence may be covered or suppressed by the buffer RAM having a relatively large memory space. Since the decoder system is free from the jitter problem, such a system capable of allowing the constant deviation can be built in the rotation servo system. Thus, the servo gain/servo range can be reduced. As a result, substantial power saving can be realized.

Also, in the recording apparatus and the encoder circuit, according to the present invention the clock of the crystal oscillator system is employed in the system defined from the input to the data writing operation to the buffer RAM, whereas the clock of the PLL system is used in the system defined from the data reading operation from the buffer RAM up to the data writing operation into the recording medium. As a consequence, as long as the PLL lock is maintained in the read control means and the encoding means, the system is free from the jitter. Thus, the stable encoding operation could be improved, and such a CLV processor circuit for reflecting the adverse influence of the jitter to the rotation servo system is no longer required, so that the entire circuit arrangement could be made simple.

As to the adverse influence of the jitter occurred between the different clock systems, this adverse influence may be covered or suppressed by the buffer RAM having a relatively large memory space. Since the encoder system is free from the jitter problem, such a system capable of allowing the constant deviation can be built in the rotation servo system. Therefore, the servo gain/servo range can be reduced. As a consequence, substantial power saving can be realized.

What is claimed is:

1. A reproducing apparatus comprising:

reproducing means for reading out data from a recording medium;

signal processing means for performing a predetermined signal process to the data read by the reproducing means;

first storage means for temporarily storing the data processed by said signal processing means;

write control means for controlling a writing operation of said signal-processed data into said first storage means;

read control means for controlling a reading operation of the data temporarily stored in said first storage means therefrom;

first clock generating means for extracting a clock synchronized with a drive of said recording medium from the data reproduced from said recording medium to thereby generate a first clock;

second clock generating means for generating a stabilized clock; and control means for controlling both of said signal processing means and said write control means based upon the first clock generated from said first clock generating means, and also for controlling said read control means based on the stabilized clock generated from said second clock generating means;

wherein the signal processing means further includes second storage means used to correct an error, and further, wherein data reading/writing operations from/to the second storage means are controlled by the control means based on the first clock generated from the first clock generating means.

2. A reproducing apparatus as claimed in claim 1 wherein said first storage means is commonly used with said second storage means.

3. A reproducing apparatus as claimed in claim 1 wherein:

said reproducing apparatus further comprises second signal processing means for expanding the signal-processed data; and said second signal processing means is controlled on the basis of said stabilized clock.

4. A reproducing apparatus as claimed in claim 2 wherein:

said reproducing apparatus further comprises second signal processing means for expanding the signal-processed data; and said second signal processing means is controlled on the basis of said stabilized clock.

5. A reproducing apparatus comprising:

a reproducing head for reading out data from a recording medium;

a signal processor for performing a predetermined signal process to the data read by said reproducing head;

a first memory for temporarily storing therein the data processed by said signal processor;

a writing operation controller for controlling a writing operation of said signal-processed data into said first memory;

a reading operation controller for controlling a reading operation of the data temporarily stored in said first memory therefrom;

a first clock generator for extracting a clock synchronized with a drive of said recording medium from the data reproduced from said recording medium;

a second clock generator for generating a stabilized clock; and a controller for controlling both of said signal processor and said writing operation controller based on the first clock generated from said first clock generator, and also for controlling said reading operation controller based upon the stabilized clock generated from said second clock generator wherein the signal processor includes a second memory and wherein the controller further controls read/write operations from/to the second memory based on the first clock generated by the first clock generator.

6. A recording apparatus comprising:

data input means;

first storage means for temporarily storing therein the inputted data;

writing control means for controlling a writing operation of the data into said first storage means;

reading control means for controlling a reading operation of the data temporarily stored into said first storage means therefrom;

signal processing means for performing a predetermined signal process to the data read out from said first storage means, the signal processing means further including second storage means used to correct an error;

recording means for recording the data processed by said signal processing means on a recording medium;

first clock generating means for extracting a sync signal previously recorded on said recording medium to thereby generate a first clock;

second clock generating means for generating a stabilized clock; and control means for controlling both of said signal processing means and said reading control means based upon the first clock generated from said first clock generating means, and also for controlling said writing control means based on the stabilized clock generated from said second clock generating means, and wherein data reading/writing operations from/to the second storage means are controlled by the control means based on the first clock.

7. A recording apparatus as claimed in claim 6 wherein said first storage means is commonly used with said second storage means.

8. A recording apparatus as claimed in claim 6 wherein:

said recording apparatus further comprises second signal processing means for compressing the inputted data; and said second signal processing means is controlled on the basis of said stabilized clock.

9. A recording apparatus as claimed in claim 7 wherein:

said recording apparatus further comprises second signal processing means for compressing the inputted data; and said second signal processing means is controlled on the basis of said stabilized clock.

10. A recording apparatus comprising:

data input terminal;

a first memory for temporarily storing therein the inputted data;

a write controller for controlling a writing operation of the data into said first memory;

a read controller for controlling a reading operation of the data temporarily stored in said first memory therefrom;

a signal processor for performing a predetermined signal process to the data read from said first memory the signal processor including a second memory;

a recording head for recording the data processed by said signal processor on a recording medium;

a first clock generator for extracting a sync signal previously recorded on said recording medium to thereby generate a first clock;

a second clock generator for generating a stabilized clock; and a controller for controlling both of said signal processor and said read controller based upon the first clock generated from said first clock generator, and also for controlling said write controller based on said stabilized clock from said second clock generator wherein the controller further controls read/write operations from/to the second memory based on the first clock generated by the first clock generator.

* * * * *

UNITED STATES PATENT AND TRADEMARK OFFICE
CERTIFICATE OF CORRECTION

PATENT NO.: 5,694,383
DATED: December 2, 1997
INVENTOR(S): YUJI ARATAKI ET AL.

It is certified that errors appear in the above-identified patent and that said Letters Patent is hereby corrected as shown below:

In Col. 10, line 47, please change "In FIG. 4" to --In FIG. 6--; and

In Col. 17, line 34, please change "encoder 132" to --encoder 62--.

Signed and Sealed this

Fourth Day of May, 1999

Attest:

Q. TODD DICKINSON

Attesting Officer

Acting Commissioner of Patents and Trademarks